UNITED STATES PATENT OFFICE.

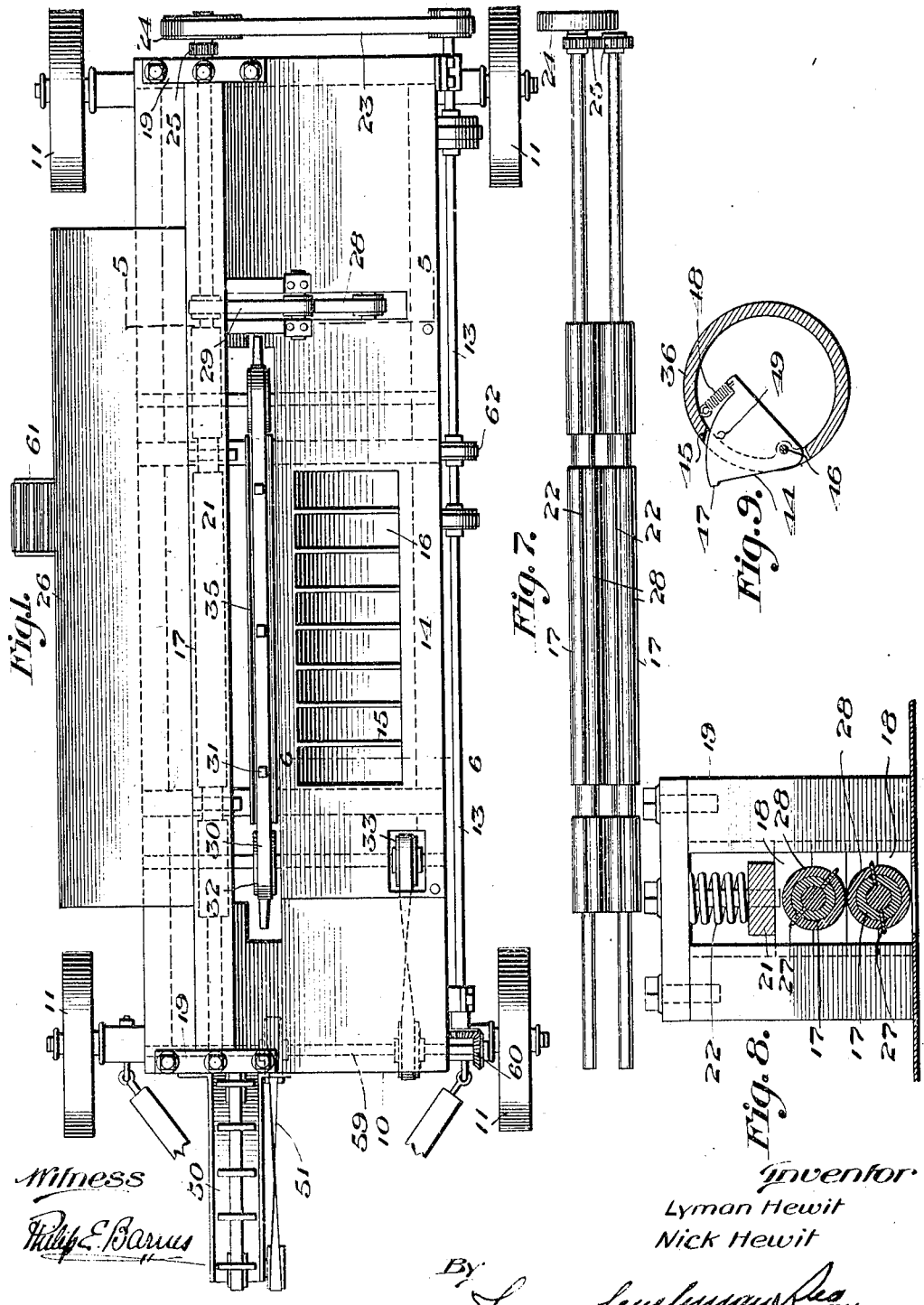

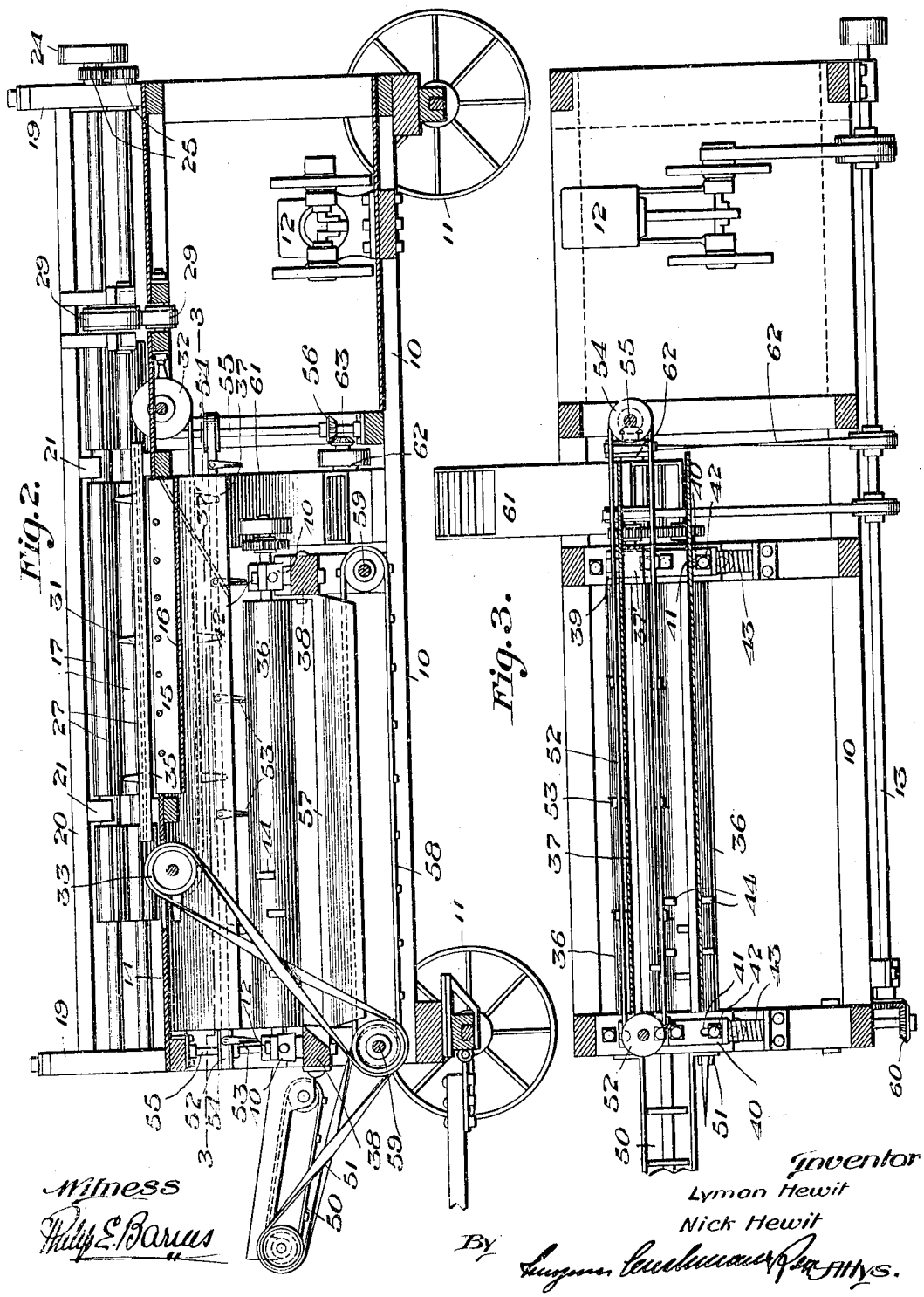

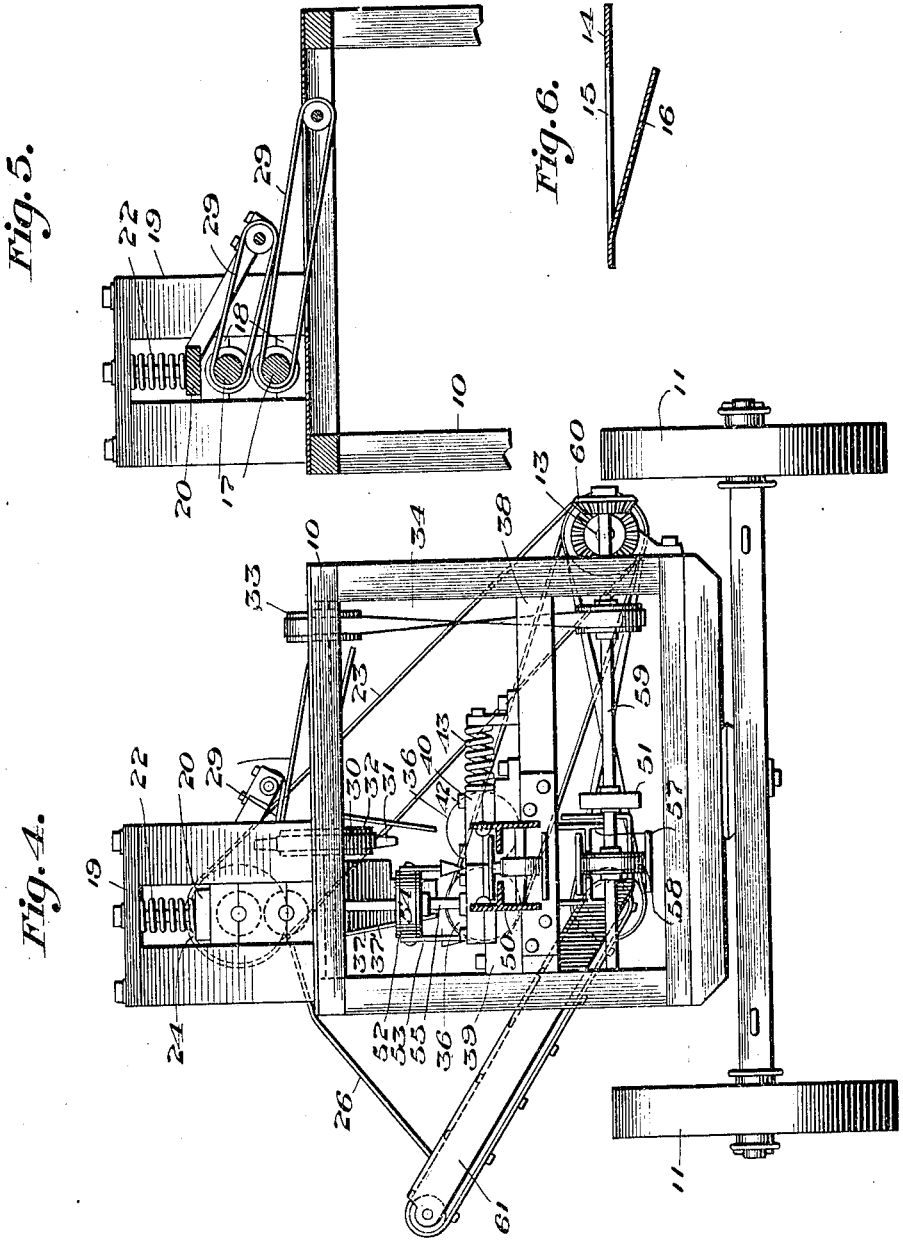

LYMAN HEWIT AND NICK HEWIT, OF SEVILLE, OHIO.

CORN-HUSKER.

1,261,529.                Specification of Letters Patent.       Patented Apr. 2, 1918.

Application filed July 10, 1916. Serial No. 108,339.

*To all whom it may concern:*

Be it known that we, LYMAN HEWIT and NICK HEWIT, citizens of the United States, residing at Seville, in the county of Medina and State of Ohio, have invented new and useful Improvements in Corn-Huskers, of which the following is a specification.

This invention relates to machines for husking corn and more particularly to that type of corn husker in which the stalks are fed through suitable snapping instrumentalities which break the ears of corn together with the husk from the stalks and the ears are then passed to suitable husking rolls which remove the husks from the ears.

The invention has as its objects to provide a machine which is very simple in construction, compact in arrangement, and which will operate efficiently and quickly in removing the ears of corn from the stalks and the husks from the ears without crushing or otherwise injuring the grain. The device is adapted to be drawn from shock to shock in the field and is provided with its own source of power for driving the various instrumentalities, and thus the stalks may be fed directly into the machine from the shocks without first transporting the stalks to one common or central point.

The above and other objects of this invention are obtained by the structure described in detail in the following specification and illustrated in the accompanying drawings, and wherein—

Figure 1 is a top plan view of the complete machine.

Fig. 2 is a vertical sectional view taken longitudinally through the center of the machine.

Fig. 3 is a horizontal sectional view taken on line 3—3, Fig. 2.

Fig. 4 is a forward end view of the machine.

Fig. 5 is a partial sectional view taken on line 5—5, Fig. 1.

Fig. 6 is a cross-sectional view of the feed-board taken on line 6—6, Fig. 1.

Fig. 7 is an enlarged detail view of the snapping rolls.

Fig. 8 is a transverse section through the snapping rolls showing the bearing blocks in which the ends of the snapping rolls are mounted in elevation.

Fig. 9 is a cross-sectional view taken through one of the hollow husking rolls illustrating the pivoted teeth mounted thereon.

Referring to the drawings wherein like numerals represent like parts, 10 designates the body or frame portion of the improved husker which, in the present instance is of skeleton box-like structure, the frame being mounted upon suitable wheels 11 to permit the device to be drawn into the field and from shock to shock, so that the stalks may be fed directly from said shocks.

Mounted upon a suitable cross-sill in the bottom of the frame-work is an engine or motor 12 of any suitable or approved type, but as the same comprises no part of this invention, it is shown more or less conventionally in the drawings. The engine 12 is belted to a main shaft 13 from which the various instrumentalities are driven, which shaft extends longitudinally along one side of the frame as shown in Fig. 3.

The top of the frame is covered to protect the working parts of the machine from rain and the like and to provide a suitable feed-board 14 which, in the present instance, has an opening therein traversed by suitable cross-bars 15 to form a grating; beneath which grating is a chute 16 inclined downwardly and outwardly toward one side of the machine to discharge any fodder or ears which might be broken off from the stalk, before they reach the snapping instrumentalities.

Mounted above the frame-work, and along one side thereof, are a pair of suitable snapping rolls 17 between which the stalks are fed. The rolls are mounted one above the other in suitable bearings, and, in the present instance, we have shown the bearing block 18 in which one end of the upper snapping roll is journaled as vertically movable in the upright guide member 19. Extending over the rolls is a strip 20 having suitable spaced-apart blocks 21 which engage the upper roll to reinforce and prevent undue flexing of the same. A coiled spring 22 is mounted in the guide member 19 and bears against the forward end of the strip 20 to force the bearing block 18 downwardly and to resiliently maintain the operating surfaces of the rolls in yielding intimate contact with each other.

The snapping rolls 17 are driven from the main shaft 13 by means of a belt 23 which passes over a pulley 24 fixed upon one end of one of said rolls, and the rolls have intermeshing pinions or gears 25 so that when the engine is driven the rolls are rotated in opposite directions, and being in intimate contact with each other, the stalk is drawn or fed between the rolls. The ears being of greater thickness than the stalks, cannot pass between the rolls, but are broken or snapped off, and the fodder or stalks after passing through the snapping rolls fall onto a downwardly inclined chute 26 which delivers the fodder to a suitable bundle tying mechanism which is not disclosed in the drawings, as this mechanism forms no part of the invention herein described.

The snapping rolls 17 may be of any suitable or improved construction, but preferably, we provide a snapping roll which comprises a solid tubular rod having on its operating faces longitudinal ribs or cleats 27, in the present instance, each roll being disclosed as having two such cleats positioned diametrically opposite each other, but, of course, the arrangement of cleats may be varied as desired. Upon the periphery of the rolls 17 between the cleats 27 is a coverings 28 of suitable resilient or elastic material, preferably, rubber, and by this construction, the cleats of one of the rolls tend to bite into or depress the elastic covering 28 of the contacting roll, and thus the fodder as it is passed through the rolls is firmly gripped or pinched, thereby insuring a steady and sure passage of the fodder through the rolls.

The fodder or stalks are fed over the feed plate or board 14 at an angle to the snapping rolls 17, the angle preferably being about 30° and to obtain this diagonal feed, we provide a pair of guide belts 29 located transversely to and at one end of the operating surfaces of the rolls 17. Each of the belts 29 is trained over pulleys on the snapping rolls, and pulleys provided in suitable bearings spaced forwardly from said rolls as shown in Fig. 5. The belts 29 are in contact with one another as shown, and while the belts rotate in different directions, the portions of the belts which are in contact with each other at any given time travel in the same direction, so that after the tassels or tops of the stalks are first gripped between the belts 29, the stalks are drawn toward the snapping rolls and fed thereto.

To assist in the snapping of the ears from the stalk and to aid the feeding of the stalks to the snapping rolls 17, we provide a novel construction which comprises an endless belt or sprocket chain 30 located immediately in front of and extending parallel to the snapping rolls, said belt or chain having outstanding fingers or projections 31 which are adapted to engage the ears of grain and break the same from the stalk. The snapper belt 30 passes over pulleys 32 fixed upon suitable transverse shafts mounted in bearings in the upper side sills of the framework. In the present instance, one of the shafts has a belt pulley 33 about which passes a belt 34 trained about a pulley upon a shaft 59, and this connection is such, that the snapper belt 30 travels over the pulleys 32 in a direction away from the guide-belts 29.

With this arrangement, it will be seen that the stalks are fed laterally across the feed-board 14 and to the snapper belt 30, and at an angle to the snapping rolls 17, and thus the fingers 31 ride or graze along the stalk and engage in the acute angle between the stalk and the ear, with the result that the ear is readily broken from the stalk. Those ears which are not broken from the stalks by the snapper belt 30 are snapped off by the snapping rolls as the stalks are drawn therethrough, the snapper belt being provided primarily to aid or assist the snapping rolls in breaking the ears from the stalks and thus partially relieving the rolls from excess strain. For the purpose of guiding the snapper belt 30 and preventing the same from being forced away from the snapping rolls, we provide between the pulleys 32 a channeled guide member 35, through which the belt 30 travels.

After the ears are snapped from the stalks either by the belt construction, or the snapping rolls, they fall or gravitate onto a pair of husking rolls 36 mounted side by side immediately beneath and extending longitudinally of the snapping rolls 17 and to prevent the ears from falling outside of said husking rolls suitable downwardly extending guard plates 37 are provided between which drop the ears of corn. Adjacent or above the inner ends of the husking rolls is a forwardly and downwardly extending leaf 37' which lies immediately beneath the snapping rolls 17 and which guides the ears to the husking rolls 36. The husking rolls 36 are mounted in suitable bearings provided upon cross-bars 38 extending transversely of the frame and preferably one of the rolls is mounted in stationary bearing blocks 39, while the ends of the other roll are mounted in movable bearing blocks 40. In the present instance, the movable bearing blocks 40 are mounted in guides 41 and each block has a slot in one side through which guide pins 42 extend, and the rolls are held in intimate contact with each other by means of suitable coiled springs 43 each engaging at one end against a moving bearing block 40, and at the other end against a suitable abutment provided on said cross-members or bars 38.

The husking rolls may be of any suitable construction, but preferably they comprise hollow tubes having spring teeth which bite into the husk to tear the same from the ears of corn, the teeth being adapted to be withdrawn within the rolls when they engage the opposite roll. In Fig. 2 only a few of the teeth are shown as mounted in the rolls 36, but it is to be understood that they are spaced at suitable distances apart throughout the length of the husking rolls. In the present instance, the teeth comprise a somewhat triangular plate 44 (shown in detail in Fig. 9,) which operate in suitable slots 45 in the walls of the tubular rolls, each of said teeth or plates being pivoted at a point adjacent one end of the slot 45 as at 46, and having at its outer corner, a slight projection or tooth 47 which is adapted to engage and bite into the husk. The plates are normally held in outward position by means of a tension spring 48 connected to the plate and roll, respectively, at its opposite ends, the outward movement of the teeth 44 being limited by pins 49 carried by the teeth and engaging the inner surface of the wall of the rolls 36.

When the husking rolls are rotated, they revolve in different directions, and as the teeth of the opposite rolls approach each other, they are normally in outward position so as to take a hold of the husk and pull the same from the ear, and upon further rotary movement of the rolls the husks are gripped between the walls of the same and drawn therethrough. When the outer ends of the teeth 44 reach the plane in which the longitudinal centers of the husking rolls lie, their engagement with the opposite rolls force them inwardly into the rolls. With this construction, the rolls 36 may be in intermediate and yielding contact with each other, at the same time permitting the teeth 44 to effectively operate for tearing off the husks from the ears.

The ears of grain upon the husking rolls 36 are adapted to be fed to a suitable belt conveyer 50 extending upwardly from the forward end of the frame 10 and adapted to deliver into a wagon or other suitable receptacle, the conveyer being driven through the belt 51, and the connections hereinafter described from the main shaft 13. To cause the ears during the husking operation and after the husks have been removed therefrom to travel toward the front end of the machine and to said conveyer 50, we provide an endless belt or sprocket chain 52 which in one direction of its travel passes immediately over the line on which the husking rolls contact. The endless belt 52 has suitable depending fingers 53 pointed at their ends, and which engage the ears upon the husking rolls. The belt 52 passes around suitable pulleys 54 fixed to vertical shafts 55 mounted in suitable bearings in the frame, one of said shafts 55 having a gear 56 which meshes with a similar second gear 63.

The husks, after passing between the husking rolls 36, fall into a trough 57 extending longitudinally beneath said husking rolls, and over the floor of this trough an endless conveyer belt 58 having suitable cross-slots is adapted to move. The belt 58 is trained about suitable pulleys mounted upon the transverse shafts 59, one of which shafts is provided with a gear 60 at its outer end meshing with a similar gear upon the main shaft 13, whereby the belt 58 is driven. The above-mentioned belt 51 and conveyer 50 are driven from the last-mentioned shaft. The belt 58 is moved through the trough to the right, referring to Fig. 2, so as to deliver the husks to a suitable conveyer 61 located centrally of the frame 10 and extending outwardly from one side thereof. The conveyer 61 is driven by means of the belt 62 from the main shaft 13 and the driven shaft 62' about which the conveyer passes is provided with the above-mentioned gear 63 meshing with the gear 56, so as to cause operation of the belt or endless chain 52 when the conveyer 61 is driven.

The operation of the device above-described, will readily be understood, it being noted that the stalks are laid upon the feed-board at an angle of about 30° to the snapping rolls, and they are fed in this position to the snapping rolls by means of the guide belts 29. The stalks pass through the snapping rolls 17, fall onto the inclined chute 26 and are bound by the binding machine, not shown. The ears of corn together with the husks are snapped from the stalks by the snapping rolls 17 or snapper belt 30, gravitate onto the husking rolls 36 along which they are moved by the endless belt 52 to the conveyer 50 and during the passage of the ears along the rolls 36, the husks are torn therefrom, which husks drop into the trough 57 and are fed by the belt 58 to the conveyer 61 which is adapted to deliver in a wagon or other suitable vehicle.

The fodder, husks and corn are delivered at different points of the machine, and all of the movable parts above described are driven from the main shaft which is driven by means of the engine motor mounted in the frame-work.

This invention is susceptible of various modifications and changes which would be within the spirit of the invention without departing from the scope of the following claims.

What is claimed is:—

1. In combination, a snapping roll, a reinforcing strip extending over said snapping roll, and bearing blocks on said strip adapted to engage the roll intermediate its ends to prevent flexing of said roll.

2. The combination with a pair of snapping rolls, of a feed table substantially parallel to the axes of the rolls, and means movable lengthwise said snapping rolls and between the feed table and said rolls for breaking some of the ears from the stalks.

3. The combination with a pair of snapping rolls, of a feed table substantially parallel to the axes of the rolls, and a plurality of fingers movable lengthwise of said snapping rolls and between the feed table and said rolls for breaking some of the ears from the stalks.

4. The combination with a pair of snapping rolls, of a feed table substantially parallel to the axes of the rolls, and an endless belt movable lengthwise of said snapping rolls and between the feed table and said rolls, and fingers on the belt for engaging and snapping some of the ears from the stalks.

5. In combination with a pair of snapping rolls rotatable in opposite directions to draw the stalks therethrough, of a pulley at either end of said rolls having its axis substantially at right angles to the axis of said rolls, an endless belt about said pulleys, a plurality of fingers on said belt adapted to move lengthwise of the rolls and immediately in front thereof to snap some of the ears from the stalks.

6. The combination with a pair of snapping rolls rotatable in opposite directions to draw the stalks therethrough, of means movable toward said snapping rolls and located adjacent one end of the operating faces thereof for engaging the ends of the stalks to feed the same at an angle to said rolls.

7. The combination with a pair of snapping rolls, of a pair of belts adjacent one end of said snapping rolls adapted to grip the end of the stalk at an angle to feed the stalk to said rolls.

8. The combination with a pair of snapping rolls, of means at one end of said rolls for feeding the stalks at an angle to the rolls, and means adjacent said rolls for engaging the ears to snap some of the same from the stalks.

9. The combination with a pair of snapping rolls, of a pair of belts adjacent one end of said snapping rolls adapted to grip the end of the stalk to feed the stalk to the rolls at an angle, and means adjacent said rolls for engaging the ears to snap some of the same from the stalks.

10. The combination with a pair of snapping rolls, of a pair of belts adjacent one end of said snapping rolls adapted to grip the ends of the stalks to feed the same at an angle to said rolls, an endless belt movable lengthwise and immediately in front of said rolls, and fingers on the belt for engaging and snapping some of the ears from the stalks.

11. A husking roll having a peripheral opening, a tooth of rigid material pivotally mounted in said opening, and a spring for normally maintaining said tooth in an outward position.

12. A husking roll having a plurality of openings, teeth mounted in said openings and each comprising a somewhat triangular plate pivoted at one corner and having a projection at its outer free end, and a spring between said roll and the inner corner of each tooth for normally maintaining the teeth in outward position.

In testimony whereof we have hereunto set our hands in presence of two subscribing witnesses.

LYMAN HEWIT.
NICK HEWIT.

Witnesses:
HUBERT F. IMMEL,
AMOS SPICE.

Copies of this patent may be obtained for five cents each, by addressing the "Commissioner of Patents, Washington, D. C."